United States Patent
Groos et al.

Patent Number: 5,231,270
Date of Patent: Jul. 27, 1993

[54] WIRE ELECTRODE

[75] Inventors: Heinrich Groos, Herborn; Hans Hermanni, Sinn-Fleisbach, both of Fed. Rep. of Germany

[73] Assignee: Berkenhoff GmbH, Heuchelheim, Fed. Rep. of Germany

[21] Appl. No.: 766,634

[22] Filed: Sep. 26, 1991

[30] Foreign Application Priority Data

Oct. 2, 1990 [DE] Fed. Rep. of Germany ... 9013722[U]

[51] Int. Cl.$^5$ .......................... B23H 7/08; B23H 7/24
[52] U.S. Cl. .................................. 219/69.12
[58] Field of Search ............... 219/69.12, 69.14, 69.15; 427/125

[56] References Cited

U.S. PATENT DOCUMENTS

| | | | |
|---|---|---|---|
| 4,341,939 | 7/1982 | Briffod et al. | 219/69.12 |
| 4,806,721 | 2/1989 | Ito et al. | 219/69.12 |
| 4,935,594 | 6/1990 | Groos et al. | 219/69.12 |
| 4,968,867 | 11/1990 | Banzai et al. | 219/69.12 |

FOREIGN PATENT DOCUMENTS

| | | |
|---|---|---|
| 0348594 | 1/1990 | European Pat. Off. |
| 55-48536 | 4/1980 | Japan ............ 219/69.15 |
| 57-15636 | 1/1982 | Japan . |
| 61-32872 | 2/1986 | Japan . |
| 2015909 | 9/1979 | United Kingdom . |

OTHER PUBLICATIONS

Patent Abstract of Japan; vol. 9, No. 25 (M-355) (1748) Feb. 2, 1985: JP 59-169723 (Tatsuta Densen K.K.) Sep. 25, 1984 (1 page).

Primary Examiner—Geoffrey S. Evans
Attorney, Agent, or Firm—Flynn, Thiel, Boutell & Tanis

[57] ABSTRACT

A wire electrode for cutting of workpieces by means of spark erosion, which consists of an eroding wire with or without a jacket, with at least the jacket containing one or several metallic alloy parts having a low volatilization temperature, such as zinc, cadmium, lead, antimony, bismuth, graphite or the like, the wire electrode is, in order to yet further increase with little increased expense the removal performance and the finished surface quality, coated with a surface layer of an electrically highly conductive material, as for example silver, gold, rhodium, palladium or iridium or a very thin layer thickness of its alloys.

3 Claims, 2 Drawing Sheets

WIRE ELECTRODE

FIELD OF THE INVENTION

The invention relates to a wire electrode for cutting of workpieces by means of spark erosion comprising an eroding wire with or without a jacket, with at least the jacket containing one or several metallic alloy parts having a low volatilization temperature, such as zinc, cadmium, lead, antinomy, bismuth, graphite or the like.

BACKGROUND OF THE INVENTION

A wire electrode with a jacket having a low volatilization temperature, is already known from DE-P 29 06 245 (corresponds to U.S. Pat. No. 4 287 404). The jacket of the eroding wire has the advantage that a high-tensile eroding wire can be used, which during erosion can be maintained under a high tension by means of tensioning devices so that a clean cut is created. A strand breakage during cutting can now be avoided since the metal layer of the jacket forms a thermal shield, which furthermore, because of its small thickness, is quickly pierced by the discharge crater and releases alloy parts of a low volatilization temperature, as for example zinc. In this respect a covered wire electrode is substantially more advantageous than a not covered one.

It is furthermore known from Japanese Offenlegungsschrift 50-102999, cited in DE-P 29 06 245, Column 2, lines 20 to 24, to cover a high-tensile material wire electrode with a highly conductive metal, such as gold or silver, in order to protect the electrode against loss of its flexibility due to contamination during discharge. An improvement of the cutting characteristics of such a wire electrode could not be found (see the reference). Rather the cutting characteristics correspond only with those which the electrode wire itself has. Such wire electrodes with silver coatings have therefore not been successful but instead those with jackets of metals or metal alloys, which have at least a low-melting part, have.

It is desired in every case that the cutting performance, namely, the removal performance in mm²/min and/or the surface quality is further improved.

It is therefore the purpose of the invention to provide a wire electrode of the type identified in detail above, in which without any significant extra expense the removal performance and the finished surface quality is still further increased.

The purpose is attained according to the invention by the wire electrode being covered with a surface layer of an electrically highly conductive material, such as silver, gold, rhodium, palladium, iridium or a very thin surface layer thickness of their alloys. It is advantageous for economical reasons that the surface layer consists of silver. It has proven to be particularly advantageous when the surface layer has a layer thickness of 0.05 to 0.8 μm. Tests have shown that already an effect worth mentioning results starting with layer thicknesses of 0.02 μm. It is advantageous when the core of the eroding wire consists of an electrically well conducting material, such as copper, brass, (Cu-Zn), bronze, (Cu-Sn), steel with a Cu-jacket, tungsten, molybdenum or the like.

Already in the above-mentioned DE-P 29 06 245 the thought was considered to surround the eroding wire first with a copper or silver layer, which is then covered with the metal layer effecting the thermal protection. An increase in the cutting performance, however, was not achieved in this manner. The invention moves away from both directions described in detail above: On the one hand, the highly conductive layer is now not applied between eroding wire and jacket but to the outside of the jacket, if a coated eroding wire is used at all. On the other hand, it is kept extremely thin and especially the extremely thin layer thickness results in an increase in the cutting performance of approximately 20%. The evenly thin silver layer, which reduces the wear of the electrode and has a high conductivity, increases the current density. This extremely thin, highly conductive, layer does thereby also not hinder the volatilization of the low-volatilizing alloy parts lying below the layer. It is conceivable, as an explanation of this phenomena, that it is the result of the skin effect.

BRIEF DESCRIPTION OF THE DRAWINGS

Greater details of the invention will be explained hereinafter in connection with one exemplary embodiment illustrated in the drawings, in which.

DETAILED DESCRIPTION

Figures 1, 2:
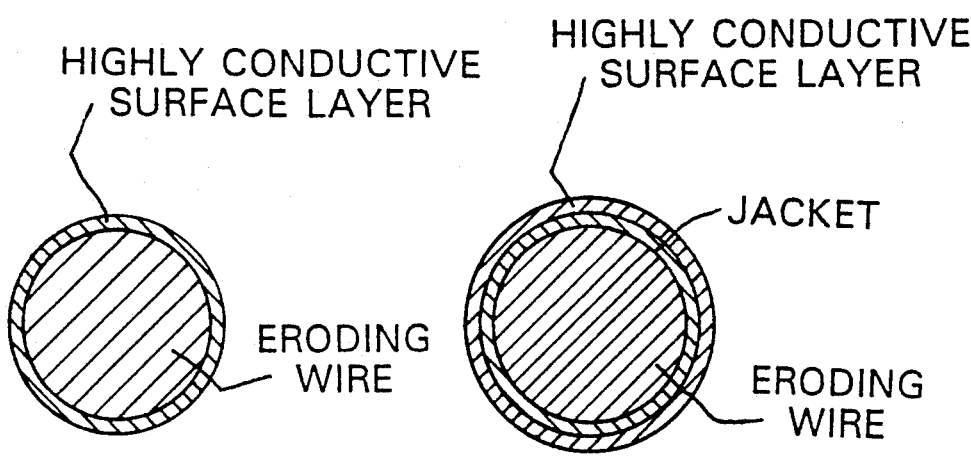
FIG. 1 is a cross-sectional illustration of one embodiment of the wire electrode.
FIG. 2 is a cross-sectional illustration of a further embodiment of the wire electrode.
Figure 3:
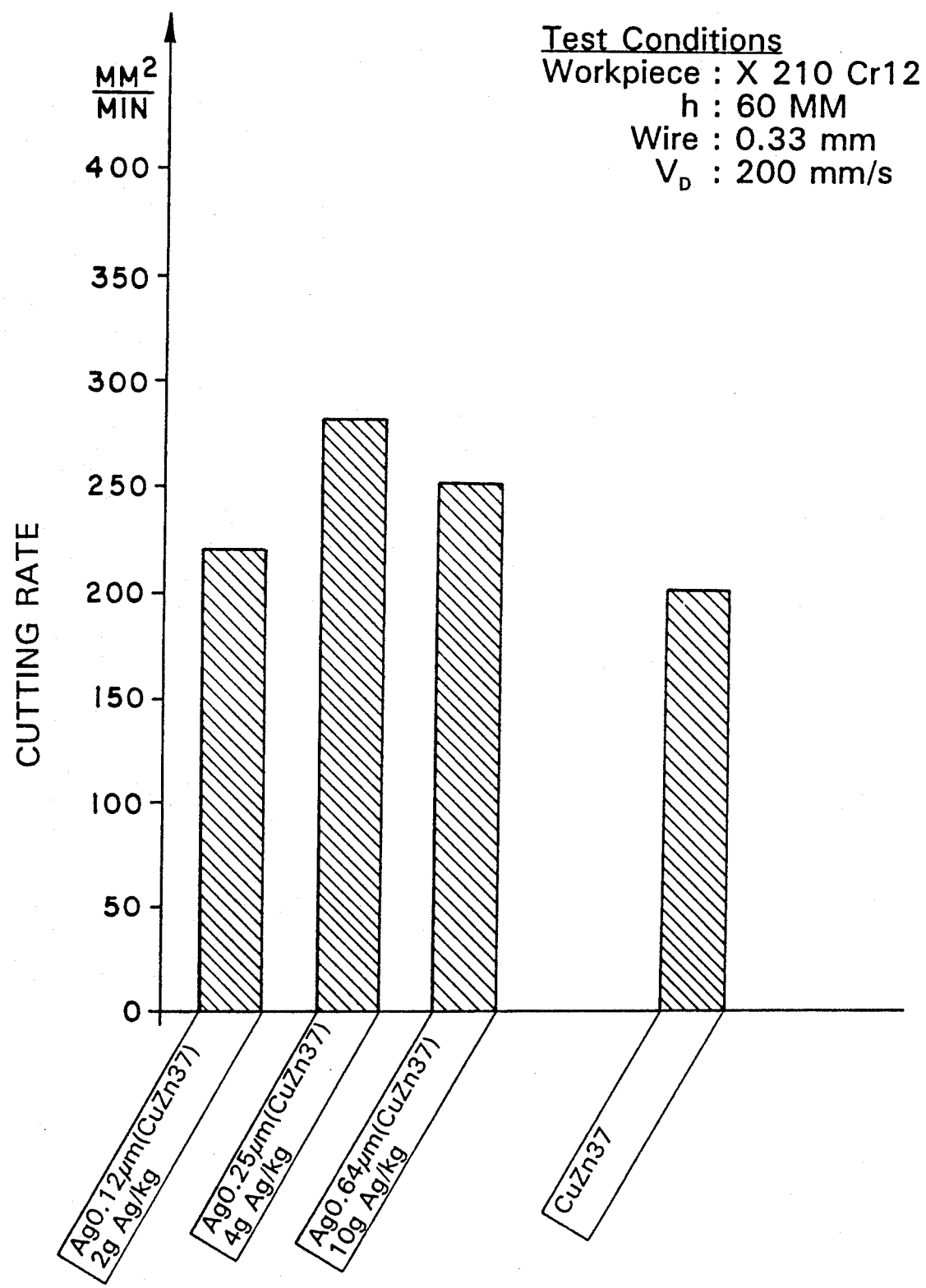
FIG. 3 is a chart comparing a blank brass eroding wire with different brass containing eroding wires.

The chart (FIG. 3) shows measurement results in a comparison of a blank or uncoated brass eroding wire to different brass eroding wires coated in different ways with a pure silver layer. Thus, a significant increase in the removal performance can be found in eroding wires with a 0.33 mm diameter when the eroding wire is silver-coated. The coatings of 2 to 10 g/kg brass listed in the chart result with this diameter in a silver layer of 0.12 to 0.64 μm.

The tests illustrated in the chart were carried out in modern cutting systems with generators of 200 to 300 kHz. It was found during these tests that the spark discharges are transmitted precisely and cleanly without attenuation, while noncoated eroding electrodes have the tendency to cause the spark transmissions to be attenuated.

Furthermore, this highly conductive layer effects a very even erosion, which is particularly advantageous during finish and precision cutting. The high current density corresponding with the skin effect has the result that the wear of the electrode is reduced compared with normal electrodes. This makes it possible to reduce the running speed of the wire electrode during finish and precision cutting (cost savings), the crater formation is at the same time flatter so that a lesser amount of surface roughness is produced. The sliding resistance at the electrocontact location is significantly improved through the ductile layer of the highly conductive material. Wear is reduced, substantially less vibrations exist, and the wire runs quietly during a precise cut.

The surface of the highly conductive layer has a greater contact capability due to the high conductivity of the thin layer. This results in a more precise and quicker positioning during the initial adjusting or setup and thus results in a significant time and cost savings. The worn silver, gold particles, etc. moreover result in an improved conductivity in the cutting channel so that the spark transmission is also improved. Furthermore, a reduction of the stress corrosion of the core material is achieved with the ductile coat. Ultimately this improves the life of the electrode wire.

The wire electrode can be made in at least three different ways, namely:
1. Galvanic or electrolytic application,
2. Application by dip coating and subsequent mechanical reduction, for example by drawing, or
3. Manufacture of a core wire and a cover tube of silver, insertion of the wire into the cover tube and subsequently reducing the cross section, with rolling and drawing being used.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a wire electrode for cutting of workpieces by means of spark erosion comprising an eroding wire with or without a jacket, with at least the jacket containing one or several metallic alloy parts having a low volatilization temperature consisting of one of zinc, cadmium, lead, antimony, bismuth and graphite, the improvement wherein the core of the eroding wire comprises an electrically conducting material, and wherein the wire electrode is coated on all peripheral surfaces with an electrically highly conductive material layer consisting of one of silver, gold, rhodium, palladium and iridium and their alloys having a thickness of 0.05 micron to 0.8 micron that improves the cutting rate of the electrode.

2. The wire electrode according to claim 1, wherein the surface layer consists of silver.

3. The wire electrode according to claim 1, wherein the core of the eroding wire consists of one of copper, copper core with brass, brass, (Cu-Zn), bronze, (Cu-Sn), steel with a Cu-jacket, tungsten, and molybdenum.

* * * * *